United States Patent
Choung

(10) Patent No.: US 10,060,315 B2
(45) Date of Patent: Aug. 28, 2018

(54) DIESEL PARTICULATE FILTER COATED WITH SELECTIVE CATALYTIC REDUCTION AND EXHAUST GAS AFTERTREATMENT SYSTEM INCLUDING THE SAME

(71) Applicant: HYUNDAI MOTOR COMPANY, Seoul (KR)

(72) Inventor: Jin Woo Choung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 85 days.

(21) Appl. No.: 15/166,350

(22) Filed: May 27, 2016

(65) Prior Publication Data

US 2017/0122158 A1     May 4, 2017

(30) Foreign Application Priority Data

Oct. 28, 2015 (KR) .......................... 10-2015-0150345

(51) Int. Cl.
*F01N 3/035* (2006.01)
*B01D 53/94* (2006.01)
*F01N 3/20* (2006.01)

(52) U.S. Cl.
CPC ......... *F01N 3/035* (2013.01); *B01D 53/9431* (2013.01); *B01D 53/9472* (2013.01); *F01N 3/2066* (2013.01); *B01D 53/944* (2013.01); *B01D 53/9418* (2013.01); *B01D 53/9481* (2013.01); *B01D 2255/104* (2013.01); *B01D 2255/2063* (2013.01); *B01D 2255/2073* (2013.01); *B01D 2255/20723* (2013.01);
(Continued)

(58) Field of Classification Search
CPC ... F01N 3/035; B01D 53/9418; B01D 53/955; B01D 2255/104; B01D 2255/2063

USPC ............................ 422/169, 177, 180; 60/274
See application file for complete search history.

(56) References Cited

U.S. PATENT DOCUMENTS

| | | | |
|---|---|---|---|
| 7,799,298 B2* | 9/2010 | Pfeifer | B01D 53/9418 423/213.2 |
| 8,844,274 B2 | 9/2014 | Lambert et al. | |
| 2014/0271425 A1* | 9/2014 | Nazarpoor | B01D 53/945 423/213.2 |

FOREIGN PATENT DOCUMENTS

| | | |
|---|---|---|
| EP | 1 486 248 A1 | 12/2004 |
| JP | 2009-045584 A | 3/2009 |

(Continued)

OTHER PUBLICATIONS

Dal Young Yoon et al., "A Combinatorial Chemistry Method for Fast Screening of Perovskite-Based NO Oxidation Catalyst", ACS Combinatorial Science, 2014, pp. 614-623.

*Primary Examiner* — Tom P Duong
(74) *Attorney, Agent, or Firm* — Brinks Gilson & Lione

(57) ABSTRACT

A diesel particulate filter coated with selective catalytic reduction includes: a support in which channels are formed from a front side to a rear side, a perovskite catalyst, and a selective catalytic reduction. In particular, the channels include an inlet channel which has an opened inlet and a closed outlet, and an outlet channel which is disposed adjacent to the inlet channel and has a closed inlet and an opened outlet. The perovskite catalyst is provided in an inner surface of the inlet channel, and the selective catalytic reduction is provided in an inner surface of the outlet channel. The perovskite catalyst is represented as $La_{1-x}Ag_xMnO_3$ (here, $0<X<1$).

4 Claims, 4 Drawing Sheets

(52) U.S. Cl.
CPC .............. *B01D 2255/20738* (2013.01); *B01D 2255/20761* (2013.01); *B01D 2255/20776* (2013.01); *B01D 2255/402* (2013.01); *B01D 2255/50* (2013.01); *B01D 2255/904* (2013.01); *B01D 2255/9022* (2013.01); *B01D 2255/91* (2013.01); *B01D 2255/915* (2013.01); *B01D 2255/9155* (2013.01); *B01D 2255/9202* (2013.01)

(56) References Cited

FOREIGN PATENT DOCUMENTS

| | | |
|---|---|---|
| JP | 4651039 B2 | 3/2011 |
| KR | 10-1165864 B1 | 7/2012 |
| KR | 10-2015-0059535 A | 6/2015 |

* cited by examiner

DIESEL PARTICULATE FILTER COATED WITH SELECTIVE CATALYTIC REDUCTION AND EXHAUST GAS AFTERTREATMENT SYSTEM INCLUDING THE SAME

CROSS-REFERENCE TO RELATED APPLICATION

This application claims priority to and the benefit of Korean Patent Application No. 10-2015-0150345, filed on Oct. 28, 2015, which is incorporated herein by reference in its entirety.

FIELD

The present disclosure relates to a diesel particulate filter coated with selective catalytic reduction (SDPF) and an exhaust gas aftertreatment system including the same.

BACKGROUND

The statements in this section merely provide background information related to the present disclosure and may not constitute prior art.

A research and development of a lean burn engine has been conducted to enhance energy efficiency and reduce carbon dioxide ($CO_2$) emission.

However, the lean burn engine includes a large amount of oxygen in the exhaust gas such that it is difficult to remove nitrogen oxides (NOx) even though carbon monoxide (CO) and hydrocarbon (HC) included in the exhaust gas can be easily removed using an existing aftertreatment method.

In case of a diesel particulate filter coated with selective catalytic reduction (SDPF), a selective catalytic reduction (SCR) is coated to a porous diesel particulate filter (DPF) for causing reaction of $NH_3$ supplied from a front end of the SDPF and nitrogen oxide (NOx) in the exhaust gas to thereby purifying NOx into water and $N_2$.

Further, since the SDPF serves to function as a filter, the SDPF collects particulate materials (PMs) in the exhaust gas and increases a temperature of the exhaust gas through post-injection in the engine such that PMs collected in the SDPF can be oxidized/removed.

The SDPF can be classified into a passive type and an active type, and a passive type diesel particulate filter is coated with nitrogen oxide lean NOx trap (LNT)+selective reduction catalyst. When the nitrogen oxide collected in the nitrogen oxide LNT is dissolved through post-injection, $NH_3$ is generated as a byproduct and $NH_3$ and excessive nitrogen oxide in the exhaust gas are purified in the SDPF.

SUMMARY

The present disclosure provides a diesel particulate filter coated with selective catalytic reduction, which filters particulate materials include in exhaust gas, and an exhaust gas aftertreatment system including the same.

A diesel particulate filter coated with selective catalytic reduction according to an exemplary embodiment of the present disclosure includes: a support where channels are formed at a front side and a rear side thereof, channels including an inlet channel having an opened inlet and a closed outlet and an outlet channel disposed adjacent to the inlet channel and having a closed inlet and an opened outlet; a perovskite catalyst provided in an inner surface of the inlet channel; and a selective catalytic reduction provided in an inner surface of the outlet channel, wherein the perovskite catalyst is represented as $La_{1-x}Ag_xMnO_3$ (here, $0<X<1$).

The perovskite catalyst may be represented as $La_{1-x}Ag_x\text{-}MnO_3$ (here, $0.2 \le X \le 0.8$).

The selective catalytic reduction may include at least one selected from $V_2O_5$, $WO_3$, Cu, and Fe as a catalytic component.

The selective catalytic reduction may include $V_2O_5$—$WO_3/TiO_2$, Cu-zeolite, or Fe-zeolite.

An exhaust gas aftertreatment system according to an exemplary embodiment of the present disclosure includes: a lean nitrogen oxide trap trapping nitrogen oxide included in an exhaust gas at a lean air/fuel ratio environment, detaches the trapped nitrogen oxide at a rich air/fuel ratio environment, and reducing nitrogen oxide included in the exhaust gas or detached nitrogen oxide; and a diesel particulate filter provided at a rear end of the lean nitrogen oxide trap, and coated with selective catalytic reduction.

In the diesel particulate filter coated with selective catalytic reduction (SDPF), a catalytic component included in the perovskite catalyst coated layer formed in the inlet channel effectively converts nitrogen monoxide to nitrogen dioxide to thereby improve performance of the selective catalytic reduction coated layer provided in the outlet channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
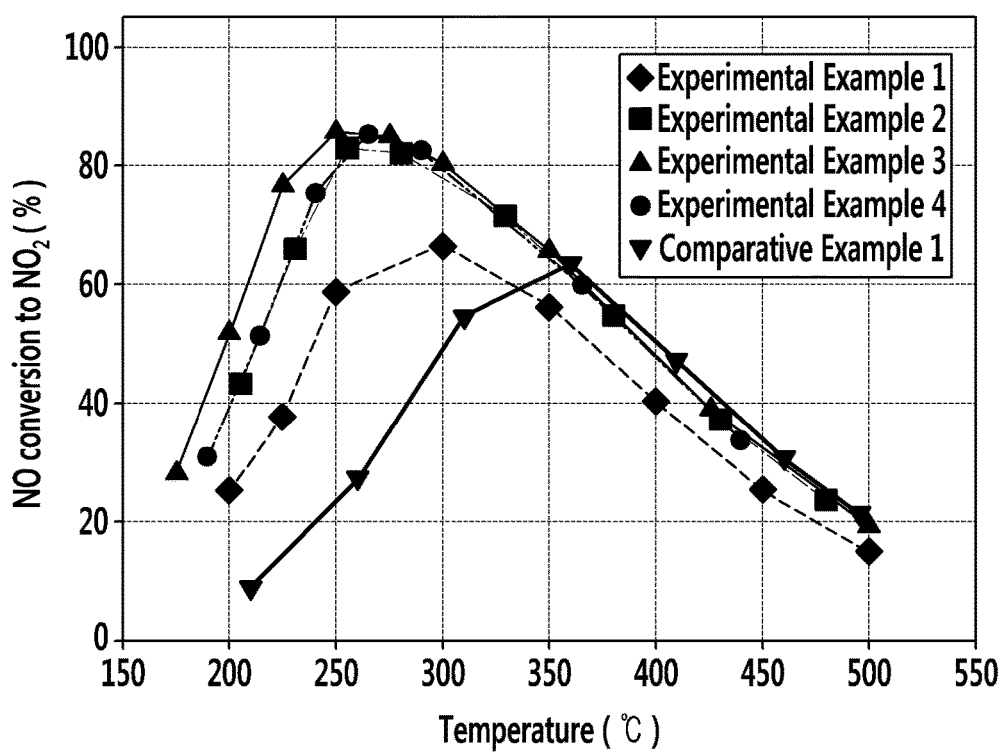
Figure 4:
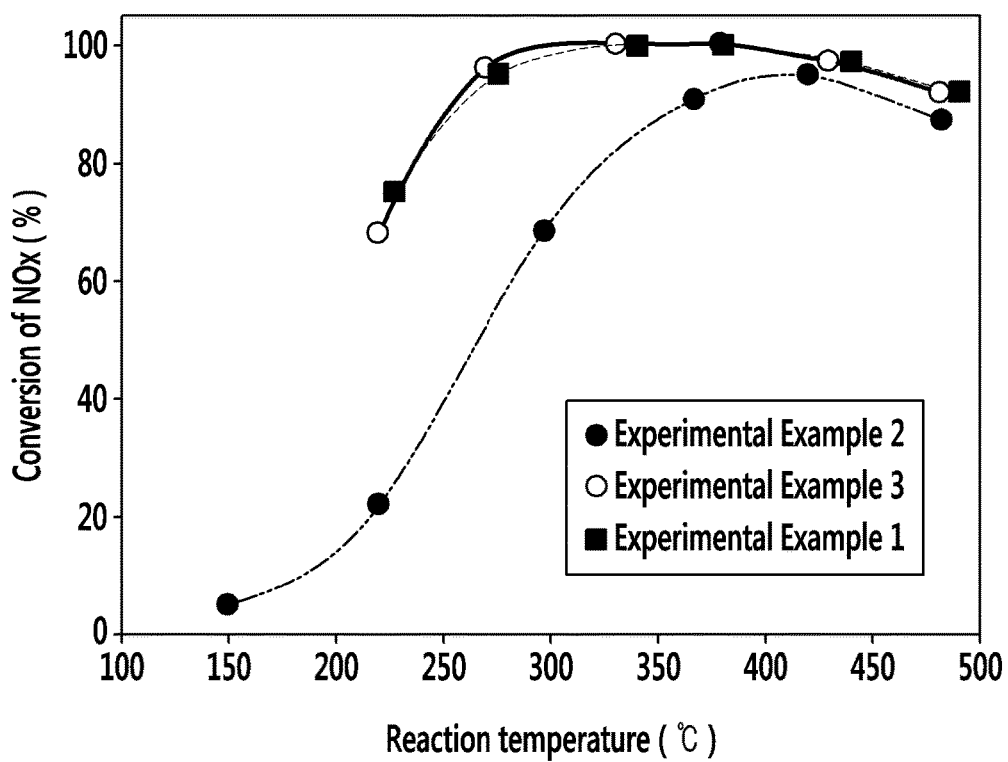

FIG. 3 is a graph illustrating a reaction temperature of a perovskite catalyst and a conversion of nitrogen monoxide in exemplary embodiments 1 to 4 and comparative example 1; and FIG. 4 is a graph illustrating a conversion of nitrogen monoxide in an exhaust gas aftertreatment system according to experimental examples 1 to 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may be implemented in various ways, and the exemplary embodiments are provided to complete the present disclosure and make the scope of the present disclosure clear to those skilled in the art.

Therefore, well-known technologies will not be described in detail in some exemplary embodiments in order to avoid unclear description of the present disclosure. Unless otherwise defined, all of terminologies (including technical and scientific terminologies) used herein may be used with meanings that those skilled in the art understand. Throughout the specification, unless explicitly described to the contrary, the word "comprise" and variations such as "comprises" or "comprising" will be understood to imply the inclusion of stated elements but not the exclusion of any other elements. Further, singular terms include plural terms, unless specifically stated otherwise.

Figure 1:
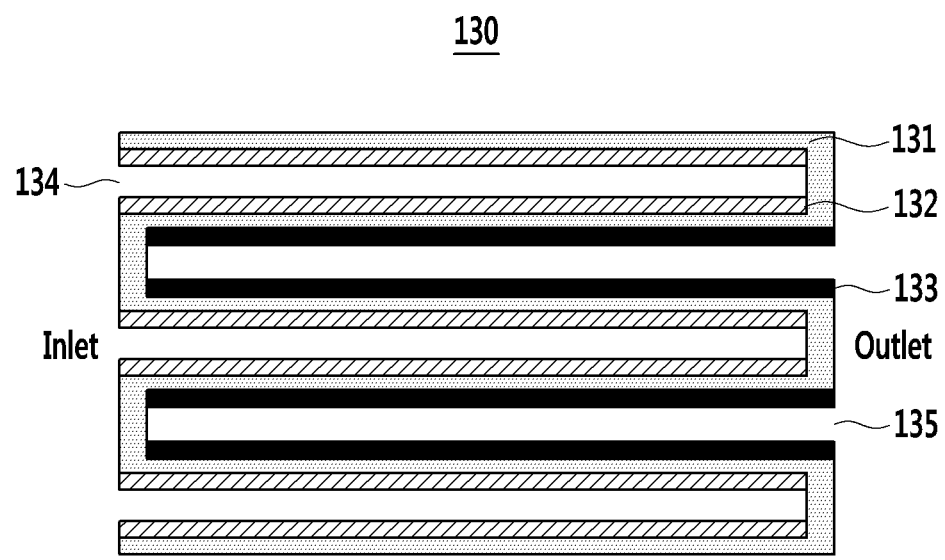
FIG. 1 is a schematic cross-sectional view of a diesel particulate filter coated with a selective reduction catalyst.

FIG. 1 is a schematic cross-sectional view of a diesel particulate filter coated with selective catalytic reduction (SDPF) according to one embodiment of the present disclosure Referring to FIG. 1, an SDPF 130 includes a support 131, a layer 132 coated with a perovskite catalyst (hereinafter, referred to as a perovskite catalyst-coated layer), and a layer 133 coated with selective catalytic reduction (hereinafter, referred to as a selective catalytic reduction-coated layer).

In the support 131, channels are formed from a front side to a rear side, and the channels include an inlet channel 134 and an outlet channel 135.

The inlet channel 134 and the outlet channel 135 are alternatively arranged, and an exhaust gas entering through an inlet of the inlet channel 134 passes through a wall of the support 131 and then is discharged through an outlet of the outlet channel 135.

Specifically, the inlet channel 134 has an opened inlet and a closed outlet, and the outlet channel 135 has a closed inlet and an opened outlet. The inlet channel 134 and the outlet channel 135 are formed adjacent to each other.

The perovskite catalyst-coated layer 132 is formed in an inner surface of the inlet channel 134. The perovskite catalyst is represented as $La_{1-x}Ag_xMnO_3$ (here, 0<X<1), and such a catalyst component oxidizes nitrogen monoxide to nitrogen dioxide included in the exhaust gas and supplies nitrogen dioxide to the selective catalytic reduction-coated layer 133 formed in the outlet channel 135. Here, the selective catalytic reduction-coated layer 133 improves purification efficiency of nitrogen oxide using nitrogen dioxide supplied from the perovskite catalyst-coated layer 132.

In addition, as the nitrogen monoxide is oxidized to nitrogen dioxide, oxidization of the particulate materials is accelerated by reaction of the particulate materials and nitrogen dioxide.

The catalyst component represented by $La_{1-x}Ag_xMnO_3$ (here, 0<X<1) increases a conversion of nitrogen monoxide at a low temperature area particularly between 200° C. to 300° C. More particularly, the perovskite catalyst may be represented as $La_{1-x}Ag_xMnO_3$ (here, 0.2≤X≤0.8).

The selective reduction catalyst-coated layer 133 is formed in an inner surface of the outlet channel 135.

The selective catalytic reduction-coated layer 133 improves purification efficiency of nitrogen oxide using nitrogen dioxide supplied from the perovskite catalyst-coated layer 132. Specifically, the selective catalytic reduction-coated layer 133 may include at least one selected from $V_2O_5$, $WO_3$, Cu, and Fe, as a catalyst component More specifically, the selective catalytic reduction-coated layer 133 may include $V_2O_5$—$WO_3/TiO_2$, Cu-zeolite, or Fe-zeolite.

When a volume ratio of nitrogen monoxide and nitrogen dioxide in the exhaust gas is 1:1 in the selective catalytic reduction-coated layer 133, purification efficiency of nitrogen oxide at a row temperature area of 200° C. to 350° C. is increased by a fast SCR reaction.

In one form, nitrogen dioxide ($NO_2$) is supplied to the selective catalytic reduction-coated layer 133 from the perovskite catalyst-coated layer 132 such that purification efficiency of nitrogen oxide of the selective catalytic reduction-coated layer 133 can be increased.

Figure 2:
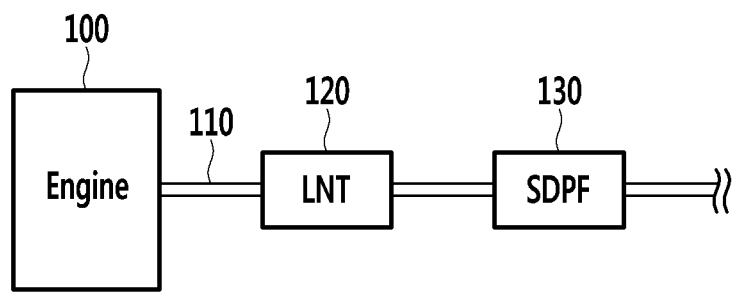
FIG. 2 is a schematic diagram of an exhaust gas aftertreatment system.

FIG. 2 is a schematic diagram of an exhaust gas aftertreatment system according to the present disclosure.

Referring to FIG. 2, the exhaust gas aftertreatment system includes an engine 100, an exhaust line 110, a lean nitrogen oxide trap 120, and a diesel particulate filter coated with selective catalytic reduction 130.

The lean nitrogen oxide trap 120 and the selective catalytic reduction-coated diesel particulate filter 130 are sequentially arranged in the exhaust line 130, and exhaust gas is purified through the lean nitrogen oxide trap 120 and the selective catalytic reduction-coated diesel particulate filter 130 and then discharged to the outside.

The lean nitrogen oxide trap 120 traps nitrogen oxide included in an exhaust gas included in the exhaust gas under a lean air/fuel ratio environment, and detaches the trapped nitrogen oxide under a rich air/fuel ratio environment and thus reduces the nitrogen oxide included in the exhaust or the detached nitrogen oxide. The lean air/fuel ratio environment indicates that a ratio (λ) of actual amount of air relative to theoretical amount of air is more than 1, and the rich air/fuel ratio environment indicates that a ratio (λ) of actual amount of air relative to theoretical amount of air is less than 1.

Under the rich air/fuel ratio environment, the lean nitrogen oxide trap 120 generates ammonia, and ammonia passes through the perovskite catalyst-coated layer 132 and then is adsorbed to the selective catalytic reduction-coated layer 133. Under the rich air/fuel ratio environment, ammonia generated from the lean nitrogen oxide trap 120 is passed rather than being oxidized due to lean oxygen in the perovskite catalyst-coated layer 132.

The lean nitrogen oxide trap 120 traps nitrogen oxide included in the exhaust gas in the lean air/fuel environment, but partially slipped nitrogen monoxide is oxidized to nitrogen dioxide in the perovskite catalyst-coated layer 132. Nitrogen dioxide which passed through the perovskite catalyst-coated layer 132 then reaches the selective catalytic reduction-coated layer 133 and is stored in the selective catalytic reduction-coated layer 133 and removed by reaction with ammonia.

The particulate materials collected in the diesel particulate filter 130, which is coated with the selective catalytic reduction, is effectively oxidized and thus removed by nitrogen dioxide generated from the perovskite catalyst-coated layer 132 and by oxygen supply effect from the perovskite catalyst-coated layer 132.

The following examples illustrate the present disclosure in more detail.

Preparation Example: Preparing of Perovskite Monolith Type Catalytic Reactor

A perovskite monolith type catalytic reactor for NO oxidation performance evaluation coated a cordierite substrate with perovskite by a general dipping method. As the cordierite support used for coating, a 400 cpsi cell monolith having a diameter of 0.7 inch and a height of 0.57 inch was used. Dipping→air blowing→drying (110° C.) were repeated on slurry prepared by mixing a perovskite catalyst and distilled water at a predetermined ratio and performing ball-milling thereon until 40 wt % against the cordierite is supported in the support. Finally, the coated monolith catalytic reactor was fired for five hours under air atmosphere of 700° C. and then the NO oxidation performance evaluation was performed by the following evaluation method.

Evaluation Method: NO Oxidation Performance Evaluation

The NO oxidation performance evaluation was performed in a fixed bed continuous flow reactor system and the monolith type catalytic reactor upon the evaluation was used. The injected reaction gas concentration was NO of 400 ppm, $O_2$ of 8%, $H_2O$ of 10%, and a balance of $N_2$, the reactor space speed was maintained at 30,000 h-1 upon the evaluation, and a change in the reaction gas concentration after and before the reaction was analyzed by an FT-IR (Nicolet 6700, Thermo Electronic Co.) connected to the reactor online.

Example 1: Nitrogen Monoxide Conversion Test of Perovskite Catalyst

The exhaust gas including NO of 400 ppm as a volume %, $O_2$ of 8%, $H_2O$ of 10%, and a balance of $N_2$ was supplied to the monolith catalyst coated with a $La_{0.9}Ag_{0.1}MnO_3$ catalyst at a space speed of 30,000 h-1.

The conversion of NO for each temperature was measured by the foregoing evaluation method and the measurement results were shown in FIG. 3.

Example 2

Example 2 was performed by the same method as Example 1 except that the monolith catalyst coated with the $La_{0.8}Ag_{0.2}MnO_3$ catalyst was prepared.

The conversion of NO for each temperature was measured by the foregoing evaluation method and the measurement results were shown in FIG. 3.

Example 3

Example 3 was performed by the same method as Example 1 except that the monolith catalyst coated with a $La_{0.5}Ag_{0.5}MnO_3$ catalyst was prepared.

The conversion of NO for each temperature was measured by the foregoing evaluation method and the measurement results were shown in FIG. 3.

Example 4

Example 4 was performed by the same method as Example 1 except that the monolith catalyst coated with the $La_{0.2}Ag_{0.8}MnO_3$ catalyst was prepared.

The conversion of NO for each temperature was measured by the foregoing evaluation method and the measurement results were shown in FIG. 3.

Comparative Example 1

Comparative Example 1 was performed by the same method as Example 1 except that the monolith catalyst coated with the $La_{0.9}Sr_{0.1}MnO_3$ catalyst was prepared.

The conversion of NO for each temperature was measured by the foregoing evaluation method and the measurement results were shown in FIG. 2.

It could be appreciated from FIG. 3 that the perovskite catalyst manufactured in Examples 1 to 4 has the excellent conversion of the nitrogen monoxide and in particular, has the more excellent conversion in the low temperature area of 200° C. to 300° C.

Experimental Example 1: Nitrogen Oxide Removal Experiment

The exhaust gas including NO of 400 ppm as a volume %, $O_2$ of 8%, $H_2O$ of 10%, and a balance of $N_2$ was supplied to 1.1 cc of the $La_{0.5}Ag_{0.5}MnO_3$ catalyst prepared at a 20/30 mesh at a space speed of 60,000 h-1 at 250° C. The passing exhaust gas was added with the reaction gas so that the whole reaction gas becomes $NH_3$ of 500 ppm, NOx of 500 ppm, $O_2$ of 5.6%, $H_2O$ of 10%, and a balance of $N_2$ to flow in 0.95 cc of $V_2O_5$—$WO_3/TiO_2$ selective catalytic reduction prepared at the 20/30 mesh at a space speed of 100,000 h-1.

The conversion of nitrogen oxide (NOx) of the exhaust gas passing through the selective catalytic reduction was measured and the measured results were shown in FIG. 4.

Experimental Example 2

The $La_{0.5}Ag_{0.5}MnO_3$ catalyst was not disposed at a front stage of the selective catalytic reduction and only the $V_2O_5$—$WO_3/TiO_2$ selective catalytic reduction was disposed.

The exhaust gas including $NH_3$ of 500 ppm as a volume %, NO of 500 ppm, NO of 250 ppm, $NO_2$ of 250 ppm, $O_2$ of 5%, $H_2O$ of 10%, and a balance of $N_2$ was supplied to the selective catalytic reduction at the space speed of 100,000 h-1.

The conversion of nitrogen oxide (NOx) of the exhaust gas passing through the selective catalytic reduction was measured and the measured results were shown in FIG. 4.

Experimental Example 3

The $La_{0.5}Ag_{0.5}MnO_3$ catalyst was not disposed at a front stage of the selective catalytic reduction and only the $V_2O_5$—$WO_3/TiO_2$ selective catalytic reduction was disposed.

The exhaust gas including $NH_3$ of 500 ppm as a volume %, NO of 250 ppm, $NO_2$ of 250 ppm, $O_2$ of 5%, $H_2O$ of 10%, and a balance of $N_2$ was supplied to the selective catalytic reduction at the space speed of 100,000 h-1.

The conversion of nitrogen oxide (NOx) of the exhaust gas passing through the selective catalytic reduction was measured and the measured results were shown in FIG. 4.

In the exhaust gas, the conversion of nitrogen oxide in oxygen concentration 5% $O_2$ and the conversion of nitrogen oxide in oxygen concentration 5.6% $O_2$ were equivalent to each other.

As shown in FIG. 4, the conversion of the nitrogen oxide of the exhaust gas aftertreatment system including the $La_{0.5}Ag_{0.5}MnO_3$ catalyst at the front stage of the selective catalytic reduction may have the excellent conversion of the nitrogen oxide and approximately the same conversion as Experimental Example 3 in which the volume ratio of nitrogen monoxide and nitrogen dioxide is controlled to be 1:1 may be obtained. In particular, the conversion of the nitrogen oxide was more enhanced in the low temperature area of 200 to 300° C.

The regeneration Experiment of the particulate materials used for the diesel engine to measure the purification performance of PM after 12 minutes and 60 minutes are maintained under the condition that the temperature of the front stage of the DPF is 350° C. and 640° C., respectively. The evaluation layout is configured of a DOC+DPF system, the DOC catalyst uses the monolith catalyst coated with a catalyst having a noble metal ratio of 2Pt/1 Pd, the DPF coated with a noble metal catalyst having a noble metal ratio of 1 Pt/1 Pd, the $La_{0.5}Ag_{0.5}MnO_3$ catalyst, an $Ag/CeO_2$ catalyst, respectively, was used to perform the comparison evaluation.

Experimental Example 4: Particulate Material Regeneration

The DPF coated with the noble catalyst having 1 Pt/1 Pd measures the particulate material regeneration result and the measured results were arranged in the following Table 1.

Experimental Example 5

The DPF coated with the $La_{0.5}Ag_{0.5}MnO_3$ catalyst measures the particulate material regeneration result and the measured results were arranged in the following Table.

Experimental Example 6

The DPF coated with the $Ag/CeO_2$ catalyst measures the particulate material regeneration result and the measured results were arranged in the following Table 1.

TABLE 1

|  | Regeneration at 350° C. | Regeneration at 640° C. |
| --- | --- | --- |
| Experimental Example 4 | 20% | 70% |
| Experimental Example 5 | 30% | 69% |
| Experimental Example 6 | 17% | 64% |

As illustrated in the above Table 1, in the Experimental Example 4, it could be confirmed that the regeneration rates are equal or excellent at both of the temperatures of 350° C. and 640° C. and, in particular, the regeneration ratios are excellent in a region of 350° C.

As the NO is oxidized into the $NO_2$ in the diesel particulate filter, it may be confirmed that the particulate materials are oxidized by the reaction of the particulate material with the $NO_2$.

The present disclosure is not limited to the above Examples but may be manufactured in different various forms and it may be understood that a person having ordinary skilled in the art to which the present disclosure pertains may perform other detailed forms without changing the technical ideas or the essential features of the present disclosure. Therefore, it should be understood that the above-mentioned embodiments are not restrictive but are exemplary in all aspects.

DESCRIPTION OF SYMBOLS

100: engine
110: exhaust line
120: lean nitrogen oxide trap
130: diesel particulate filter coated with selective catalytic reduction
131: support
132: perovskite catalyst
133: selective catalytic reduction
134: inlet channel
135: outlet channel

What is claimed is:

1. A diesel particulate filter coated with selective catalytic reduction, comprising:
    a support where channels are formed from a front side to a rear side thereof, the channels including:
        an inlet channel comprising an opened inlet and a closed outlet, and
        an outlet channel disposed adjacent to the inlet channel, and comprising a closed inlet and an opened outlet;
    a perovskite catalyst provided in an inner surface of the inlet channel; and
    a selective catalytic reduction provided in an inner surface of the outlet channel,
    wherein the perovskite catalyst is represented as $La_{1-x}Ag_xMnO_3$, where $0<X<1$, and
    wherein the selective catalytic reduction comprises $V_2O_5$—$WO_3/TiO_2$.

2. The diesel particulate filter of claim 1, wherein the perovskite catalyst is represented as $La_{1-x}Ag_xMnO_3$, where $0.2 \leq X \leq 0.8$.

3. The diesel particulate filter of claim 1, wherein the perovskite catalyst is configured to oxidize nitrogen monoxide included in exhaust gas flowing into the inlet channel to nitrogen dioxide and configured to supply the nitrogen dioxide to the selective catalytic reduction of the outlet channel.

4. An exhaust gas aftertreatment system comprising:
    a lean nitrogen oxide trap configured to trap nitrogen oxide included in an exhaust gas under a lean air/fuel ratio environment, detach the trapped nitrogen oxide under a rich air/fuel ratio environment, and reduce the nitrogen oxide included in the exhaust gas or the detached nitrogen oxide; and
    a diesel particulate filter provided at a rear end of the lean nitrogen oxide trap, and coated with the selective catalytic reduction of claim 1.

* * * * *